Aug. 26, 1958 C. D. KLAPP 2,849,626
MONOSTABLE CIRCUIT
Filed April 15, 1955
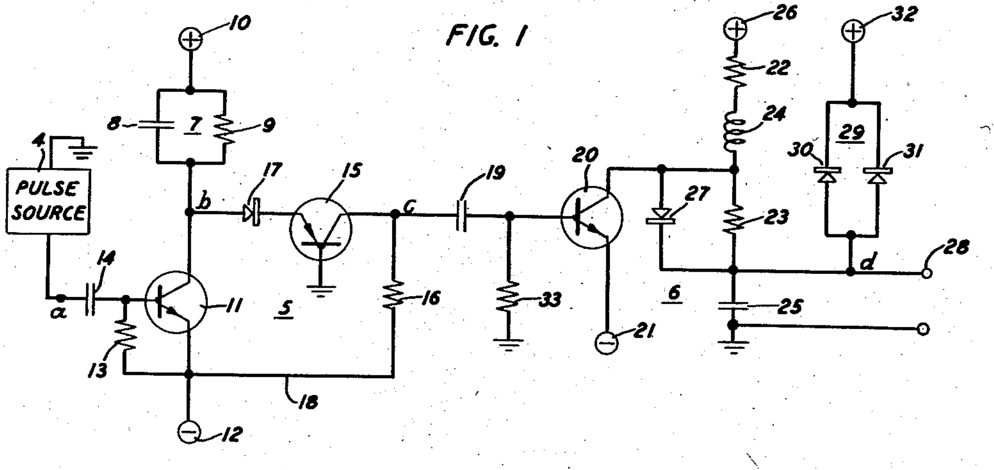
FIG. 2
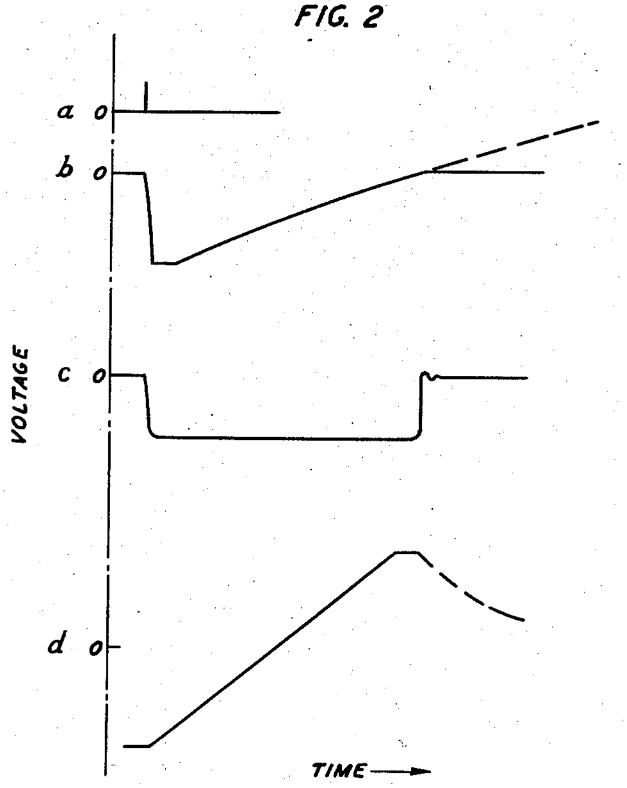
INVENTOR
C. D. KLAPP
BY W. L. Keefauver
ATTORNEY

United States Patent Office 2,849,626

Patented Aug. 26, 1958

2,849,626

MONOSTABLE CIRCUIT

Claude D. Klapp, Los Angeles, Calif., assignor to Bell Telephone Laboratories, Incorporated, New York, N. Y., a corporation of New York Application April 15, 1955, Serial No. 501,612

4 Claims. (Cl. 307—88.5)

This invention relates to wave-shaping circuits and more particularly to trigger circuits for generating voltage waves having the duration of portions thereof accurately defined.

In many circuit applications it is necessary to produce a voltage having a particular wave shape and having the duration of at least a portion thereof precisely controlled. Such voltage must be generated independently of the magnitude and duration of a triggering pulse. This invention is concerned primarily with circuits for generating a voltage having a precisely controlled rectangular wave shape and using such voltage to trigger another circuit which generates a wave having a leading edge with predetermined slope characteristics. There are known circuits for producing voltage waves of such configurations but they involve a substantial number of components and consume a great amount of power.

It is therefore an object of this invention to reduce the number of components and the power consumption in such wave-shaping circuits.

In carrying out the invention in one embodiment thereof the current flowing through a load resistor is controlled by a parallel RC circuit, and two electronic switches. The first switch is under the control of triggering pulses and the second switch is under the combined control of the first switch and the RC circuit. A triggering pulse momentarily actuates the first switch. This causes the second switch to be actuated in turn and causes the capacitor in the RC circuit to be charged. The charge on the capacitor holds the second switch actuated until the charge has been dissipated to a predetermined level. The resultant rectangular voltage wave appearing across the load resistor is used to control a linear slope circuit.

Additional advantages and objects of this invention will be apparent from a consideration of the following specification including the single sheet of the drawing in which Fig. 1 is a schematic diagram of a linear slope circuit that is driven by a timing circuit according to the present invention. Fig. 2 is a series of voltage wave shapes (not to scale) appearing at the points designated in Fig. 1.

The embodiment of the invention shown in Fig. 1 includes a source of triggering pulses 4 and a monostable timing circuit 5 which is arranged to drive the linear slope circuit 6. A parallel RC circuit 7, comprising the capacitor 8 and the resistor 9, has one end thereof connected to a positive potential source 10. Timing circuit 5 includes two electronic switches. The n-p-n transistor 11 is the first switch, and it has its internal emitter-collector circuit connected from the other end of RC circuit 7 to a negative potential source 12. The external base-emitter circuit of transistor 11 is completed by the resistor 13 which is connected between the p-type base portion and the n-type emitter portion of transistor 11. Triggering pulses from source 4, which has one terminal thereof grounded, are applied to the base-emitter circuit of transistor 11 in timing circuit 5 through the capacitor 14.

The load resistor 16 is connected to the collector of transistor 11 by diode 17 and the internal emitter-collector circuit of the second electronic switching device in timing circuit 5, n-type point contact transistor 15. The base terminal of transistor 15 is connected to a reference potential point, such as ground, intermediate the potentials of sources 10 and 12. A lead 18 connects the other end of resistor 16 to the emitter terminal of transistor 11. The use of transistors having base materials of opposite conductivity types for switches 11 and 15 makes it possible to bias one open and the other closed, in the quiescent circuit condition, with a single source of potential.

Diode 17 is included in circuit as a safety precaution to assure current flow in the correct direction. This is desirable since the reverse impedance of the emitter contact by itself is low enough to permit reverse current to flow under some conditions.

Timing circuit 5 is coupled to slope circuit 6 by the capacitor 19 which is connected between the collector terminal of switch 15 and the base terminal of the n-p-n transistor switch 20. The emitter terminal of transistor 20 is connected to a negative potential source 21 having a potential approximately equal to the minimum value of the desired slope voltage. The resistor 22 and the inductor 24 are connected in series between the source of positive potential 26 and the collector terminal of switch 20. A resistor 23 and the capacitor 25 are serially connected between the same collector terminal and ground. A diode 27 is connected in parallel with resistor 23. The output voltage of the slope circuit appears between the terminal 28 and ground. Terminal 28 is connected to capacitor 25. A clipping circuit 29 comprising the diodes 30 and 31 and the source 32 is connected to terminal 28 to establish the maximum potential of the slope voltage. Two diodes were used in circuit 29 to keep the resistance of the clipping path low. The resistor 33, connected between the base of switch 20 and ground, completes the D. C. path from the base terminal to the other switch terminals.

The positive potential sources 10, 26, and 32, and the negative potential sources 12 and 21 conventionally represent connections to appropriate terminals of a direct current power supply with an intermediate tap representing ground potential.

Transistor switch 11 is biased open in the absence of triggering pulses. That is, its internal emitter-collector circuit is in its high impedance or low conduction condition. Transistor switch 15 is biased so that its internal emitter-collector circuit is in its low impedance condition, normally-closed, before switch 11 is triggered. Sources 10 and 12 provide the bias potentials. Thus in the quiescent condition of monostable timing circuit 5 current flows from source 10 through resistor 9, diode 17, the internal emitter-collector circuit of transistor 15, resistor 16, and lead 18 to source 12. Resistors 9 and 16 are so proportioned with respect to the potentials of sources 10 and 12 that the point *b* will normally be at ground potential.

Transistor 20 is normally biased to its low internal impedance condition by sources 21 and 26 as long as switch 15 is closed. In the quiescent condition of slope circuit 6 current flows from source 26 through resistor 22, inductor 24, and the internal emitter-collector circuit of transistor 20 to source 21. Switch 20 effectively short circuits capacitor 25, and point *d* is held at a fixed negative potential which is slightly less negative than that of source 21.

The circuit connections previously described for switches 11 and 20 are of the type disclosed in the copending application of P. A. Reiling, Serial No. 410,924, filed February 17, 1954. The characteristics of a transistor are such that the presence in the base terminal of an electron current in excess of a predetermined minimum value causes the internal collector-emitter impedance to be as low as five ohms or less. If the current falls below that minimum value the internal collector-emitter impedance increases to a high value which may reach the megohm range. When the collector-emitter circuit is in its low impedance condition it can conduct a certain maximum current for any particular value of base current. If the collector current is increased above that maximum current the impedance of the collector-emitter circuit increases accordingly. In the P. A. Reiling application a transistor is connected to a load circuit and a source of potential so that the maximum current that could possibly flow in the collector is less than that determined by the base electron current. By stepping the base current between values above and below the critical minimum value the collector current is stepped between values above and below its critical maximum value. This results in a corresponding change in the internal collector-emitter impedance which change approximates the operation of a switch.

In timing circuit 5, resistor 9 provides the collector circuit external impedance which makes possible the switching action of transistor 11. Resistor 9 also provides the resistive impedance for RC circuit 7 which controls the reclosing of switch 15 as will be explained below. Resistor 22 in slope circuit 6 makes possible the switching action of transistor 20, and it is one of the principal factors determining the rise time of the slope voltage appearing at *d*.

Referring to Fig. 2 when a positive pulse *a* is applied to the base of transistor 11 it momentarily biases the transistor into its low impedance condition so that the potential of point *b* drops to the potential of source 12, less the potential drop in transistor 11. This causes a potential that is nearly equal to the sum of sources 10 and 12 to be applied to the terminals of capacitor 8 and causes transistor 15 to be biased into its high internal impedance condition. The potential *c* drops off abruptly almost to the value of the terminal voltage of source 12 since the opening of switch 15 reduces the current in resistor 16 to a level that approximates the open circuit condition. During the brief interval when capacitor 8 is subjected to the sum potential of sources 10 and 12 it draws a high charging current as evidenced by the abrupt increase in the negative direction of voltage *b*.

Shortly after pulse *a* has terminated, transistor 11 returns to its high internal impedance condition. The change does not occur immediately upon the decay of pulse *a*, probably because of the well-known charge carrier storage effect which causes current to persist for a brief interval. After switch 11 has closed the potential *b* starts to rise toward the terminal voltage of source 10, as indicated in Fig. 2, as capacitor 8 discharges through resistor 9. During this time, and until point *b* is restored substantially to its original potential, switch 15 is held open by the negative potential at point *b*. Since transistor 15 cannot conduct its normal complement of current during this interval, point *c* remains at the large negative potential illustrated in Fig. 2 and determined by the terminal voltage of source 12. As capacitor 8 discharges the potential of point *b* finally reaches ground potential. Transistor 15 starts to conduct again thereby raising the potential of the point *c* from the large negative value to a small negative value close to ground voltage.

Thus a short pulse, *a*, applied to the input of monostable circuit 5 has caused a considerably longer pulse, *c*, to be generated at the output thereof. While pulse *a* may be subjected to substantial variations in pulse shape, duration, and amplitude, the output pulse has an amplitude which is determined by the terminal voltage of source 12 and a duration which is determined primarily by the time constant of RC circuit 7. The charge carrier storage effect mentioned above causes switch 11 to remain open a finite amount of time beyond the ending of pulse *a*, but the amount of the delay in closing is predictable for any particular type of transistor, and the design of circuit elements can take this into account. The length of pulse *a* is so small as compared to the length of pulse *c* that most increases in the length of pulse *a* due to distortion have negligible effects on the length of pulse *c*.

Pulse *c* causes transistor 20 to be biased to its high impedance condition for the duration thereof. Source 21 is thereby effectively disconnected from slope circuit 6. Capacitor 25 is charged toward the terminal voltage of source 26 through resistor 22, inductor 24 and diode 27. When capacitor 25 has attained a potential which is substantially equal to the potential of source 32, clipping circuit 29 draws off the excess current from source 26 and holds capacitor 25 at its then attained potential until transistor 20 switches back to its low impedance condition upon the termination of pulse *c*. Capacitor 25 then discharges toward the terminal voltage of source 21 through resistor 23 and the internal emitter-collector circuit of transistor 20.

Resistor 22 is so proportioned with respect to source 26, capacitor 25 and the requirements of the system in which the circuit is employed, that voltage *d* changes from one predetermined limiting value to another in exactly the prescribed time. The design value of resistor 22 must also take into account the maximum allowable collector current to maintain switch 20 in its low impedance condition when conducting as explained above. Inductor 24 is proportioned to cause voltage *d* to increase along a straight line path, hence the name "linear slope circuit." Resistor 23 was added to the circuit to limit the current in transistor 20 when capacitor 25 is discharging. Diode 27 eliminates the effect of resistor 23 in the charging circuit of capacitor 25. Resistor 23 and diode 27 are used to protect transistor 20, and they are not essential to the operation of the slope circuit.

The circuit described above is intended merely as an illustrative embodiment of the invention. Numerous other advantages, applications and modifications of the invention will be apparent to those skilled in the art and are intended to be included within the scope of the invention. For example, particular types of transistors have been indicated in the description, but it is obvious that other types could be employed to produce the same results or to produce a positive pulse at *c* with minor circuit modifications.

What is claimed is:

1. In a timing circuit for generating a pulse of predetermined duration independently of the duration of the pulses triggering said circuit, first and second electronic translating devices each having three electrodes, said devices each having high and low conduction conditions, a source of triggering pulses, a first resistor, means connecting said first resistor between one electrode of said first device and one electrode of said second device, a connection between a second electrode of said first device and a second electrode of said second device, a second resistor, a source of potential having positive and negative terminals and having an intermediate terminal providing a reference potential point, means including said second device for serially connecting said second resistor and said one electrode of said second device with said second electrode of said second device between said positive and negative terminals to bias said second device in its low conduction condition, means for applying said triggering pulses to a third electrode of said second device to trigger said second device into its high conduction condition for the duration of each triggering pulse, means including said connection between said second electrodes and a further connection between the third electrode of said first device and said reference potential point for biasing said first device into its low conduction condition in response to the triggering of said second device, a capacitor, means including said second resistor and said capacitor for holding said first device in its low conduction condition for a predetermined time longer than the duration of said triggering pulse, and means for deriving an output voltage wave from said first resistor.

2. In a timing circuit for generating a pulse of predetermined duration independently of the duration of the pulses triggering said circuit, a first and a second transistor each having a base electrode, a collector electrode, and an emitter electrode in contact with the body of said transistor, said transistors each having a high and a low conduction condition, a source of triggering pulses, a first resistor, means connecting said first resistor in series circuit relation with the internal emitter-collector circuit of said first transistor, means connecting the internal emitter-collector circuit of said second transistor in parallel with said series circuit, a second resistor, a source of potential having positive and negative terminals and having an intermediate terminal for providing a reference potential point, means serially connecting said second resistor and the internal emitter-collector circuit of said second transistor between said positive and negative terminals of said source to bias said second transistor in its low conduction condition and to bias said first transistor in its high conduction condition, and means for applying said triggering pulses to the base terminal of said second transistor to bias said second transistor into its high conduction condition for the duration of each triggering pulse, means connecting said first transistor base terminal to said reference potential point to bias said first transistor into its low conduction condition in response to the triggering of said second transistor, a capacitor, means including said second resistor and said capacitor for holding said first transistor in its low conduction condition for a predetermined time, and means for deriving an output voltage wave from said first resistor.

3. The timing circuit of claim 2 in which said deriving means comprises a linear slope circuit having input terminals and output terminals, a clipping circuit connected to the output terminals thereof to define the maximum excursion in a positive direction of the slope circuit output, and means connecting the output of said timing circuit to the input of said slope circuit.

4. In combination with a first and second transistor each having base, emitter, and collector electrodes, the bases of said transistors comprising semiconductive materials of opposite conductivity types, means connecting the collector of said first transistor to the emitter of said second transistor, means connecting the emitter of said first transistor to the collector of said second transistor and including a first resistor, means including a second resistor for applying a first voltage to the junction of the collector of said first transistor and the emitter of said second transistor, means for applying a second voltage to the junction of the emitter of said first transistor and said first resistor, said first and second voltages having magnitudes and polarities to bias said first transistor to a state of relative nonconduction and said second transistor to a state of relative high conduction, a source of triggering pulses of sufficient amplitude to overcome the bias on said first transistor and to bias said first transistor to a state of relative high conduction whereby the collector-emitter resistance of said first transistor drops to a very low value, means for applying said pulses between the base and emitter of said first transistor, means for applying a third voltage to the base of said second transistor to bias said second transistor to a state of relative nonconduction in response to the reduction of said collector-emitter resistance of said first transistor to a very low value, and means for holding said second transistor in a state of relative nonconduction a predetermined time beyond the expiration of said applied triggering pulses comprising a capacitor connected in parallel with said second resistor.

References Cited in the file of this patent

UNITED STATES PATENTS

| | | |
|---|---|---|
| 2,350,069 | Schrader et al. | May 30, 1944 |
| 2,414,486 | Rieke | Jan. 21, 1947 |
| 2,431,766 | Miller et al. | Dec. 2, 1947 |
| 2,519,802 | Wallman | Aug. 22, 1950 |
| 2,620,448 | Wallace | Dec. 2, 1952 |
| 2,663,800 | Herzog | Dec. 22, 1953 |
| 2,663,806 | Darlington | Dec. 22, 1953 |
| 2,728,857 | Sziklai | Dec. 27, 1955 |
| 2,730,576 | Caruthers | Jan. 10, 1956 |